United States Patent Office 3,793,384
Patented Feb. 19, 1974

3,793,384
HYDROCARBON CONVERSION PROCESSES AND CATALYSTS
John Garfield Chenoweth, Ivan James Samuel Lake, Roy John Sampson, and Paul Osmond, Norton, Stockton-on-Tees, England, and Douglas Shooter, Cambridge, Mass., assignors to Imperial Chemical Industries Limited, London, England
No Drawing. Filed Mar. 3, 1972, Ser. No. 231,745
Claims priority, application Great Britain, Mar. 12, 1971, 6,674/71; May 3, 1971, 12,738/71
Int. Cl. C07c 5/24, 15/08
U.S. Cl. 260—668 A          9 Claims

ABSTRACT OF THE DISCLOSURE

Specified amounts of alumina are removed from certain silica/alumina catalysts. The products are improved xylenes isomerization catalysts.

---

This invention relates to hydrocarbon conversion processes and catalysts therefor.

This invention is based on the discovery that the catalytic properties of certain silica/alumina catalysts may be improved by removing from them a specified amount of alumina. It is believed that this effect may be due to removal of alumina which is not chemically combined with silica and which is present as alumina particles from a silica/alumina matrix, and/or to the creation of catalytically favorable sites on the surface of the catalyst by the removal of alumina which is combined with silica from the surface of a silica/alumina structure. The treatment may also redistribute the silica and/or alumina into a more catalytically favorable disposition. There may be a concomitant reduction in the alkali metal content of the catalyst and this is in general beneficial.

The invention comprises isomerizing an alkyl aromatic hydrocarbon in the presence of a silica/alumina catalyst of which the alumina content has been reduced by from 1% to 35%, and preferably 7–20%, of the total alumina originally present, the catalyst comprising before treatment 7 to 40% by weight of alumina, and preferably 7 to 15% by weight of alumina and containing, after treatment, at least 6% and at most 40% of alumina by weight.

The alumina content of the catalyst may be reduced by treatment with acids or complexing agents.

Suitable acids are those of which the anions serve to solubilize the aluminium by forming complex ions. Suitable acids include sulphuric acid, hydrochloric acid, hydrofluoric acid, hydrobromic acid, nitric acid and trihaloacetic acids (for example, trichloracetic acid) and mixtures thereof.

Suitable complexing agents comprising chelating agents; for example, polar solutions (preferably aqueous solutions) of ethylene diamine tetra-acetic acid or of acetyl acetone.

Many other complexing agents may be used especially in the presence of strong acids.

The above compounds will normally be used as solutions in, for example, water or an alcohol having 1 to 5 carbon atoms, for example, a monohydroxy alkane. Suitable solvents may have in their pure state a dielectric constant of at least 5, preferably at least 10, and more preferably at least 20. The dielectric constant of the solvent is the limiting value at low frequencies at atmospheric pressure and a temperature of 25° C.

The catalyst may be contacted for from 1 minute to 1 week with a solution of a compound capable of dissolving the alumina, for example, a period of 10 minutes to 60 hours may be employed. The solution may contain 0.001 to 10 moles/litre and of the compound, and preferably 0.001 to 4 moles/litre, and more preferably 0.01 to 2 moles/litre of the compound. The conditions of the treatment are chosen in the light of the desired amount of removal of the alumina. Contact of the catalyst with these solutions preferably takes place at a temperature in the range 0 to 200° C. and very conveniently 15 to 100° C. If desired the alumina content may be reduced in several stages, for example by repeated treatment with an aqueous solution of an acid.

The alumina content of the catalyst may also be reduced by contacting it with a gaseous material, for example, hydrogen chloride or hydrogen bromide, which forms a volatile product with the alumina. The material is preferably passed through a bed of the catalyst at an elevated temperature.

The alumina content of the catalyst may also be reduced by contacting it with a solvent as aforesaid, especially water, in the presence of a strongly acidic ion exchange resin. An acidic ion exchange resin may also be used together with a solution of an acid.

After treatment the catalyst is preferably washed with water (particularly if a small volume of treatment solution is used) to remove traces of solution and aluminium and sodium. The washing may be carired out batchwise by leaving the catalyst standing in water, for example at 0–100° C. for preferably 2 to 24 hours, or by passing water through the catalyst bed, for example by treatment in Soxhlet equipment for similar times.

The catalyst before treatment to reduce its alumina content is preferably a synthetic silica/alumina catalyst having a surface area in the range 50 to 700 square metres/gram, and more preferably 70 to 300 square metres/gram. Its mean pore diameter is preferably in the range 10 to 400, and more preferably 40 to 300 A.

The catalyst may, if desired, by contacted with liquid water at a temperature above 100° C. This is preferably carried out before, or, when an aqueous solution is to be used, during the treatment to reduce its alumina content. In the latter case great care should be taken not to remove more than 35% of the alumina as this readily occurs and reduces the performance of the catalyst. Suitable methods of treatment are disclosed in our patent application No. 91,194.

It is preferred to isomerize alkyl benzenes having at most 4 carbon atoms in each alkyl group, especially the xylenes.

According to a preferred form of the invention one or more xylenes containing less than an equilibrium concentration of paraxylene are isomerized to produce a product having a higher concentration of paraxylene. Such xylenes may, for example, be mixtures of meta-xylene together with ethyl benzene, ortho- and/or para-xylene.

According to a further form of the invention one or more xylenes containing less than an equilibrium amount of orthoxylene are isomerized to produce a product having a greater concentration of orthoxylene.

The isomerization of xylenes is preferably carried out at a temperature in the range 200 to 500° C., and preferably 300 to 500° C. It is preferably carried out at a pressure of 0.5 to 50 atmospheres, and more preferably at a pressure of 1 to 5 atmospheres absolute. It is preferred to carry out the isomerization in the presence of 100 to 10,000 parts per million of steam by weight based on the xylenes.

It has been found that especially good catalysts are produced by treatment with nitric or hydrochloric acids or with ethylene diamine tetra-acetic acid. Such catalysts generally have satisfactory activities and selectivities in catalyzing the desired isomerization reaction rather than undesired disproportionation reactions in the isomerization of alkyl benzenes and may also be less prone to carbonization which necessitates regeneration by burning off carbonaceous deposits.

Amorphous silica/alumina catalyst of which the alumina content has been reduced as previously described are believed to be novel and are believed to be useful not only in the above process but in hydrocarbon conversion processes which are catalyzed by acids, for example, cracking, alkylation, dealkylation and isomerization. They are also useful as supports for hydroisomerization catalysts and reforming catalysts.

EXAMPLE 1

30 grams of a silica/alumina catalyst having an analysis of 10% alumina and 90% silica, a surface area of 178 $m.^2 g.^{-1}$ and a pore volume of 0.50 $cm.^3 g.^{-1}$ in the form of 4 mm. beads was added to 225 ml. of an aqueous solution containing 0.84 mole of hydrogen chloride/litre. After standing for 24 hours at room temperature the catalyst was filtered and dried in an oven at 200° C. for 15 hours. Analysis of the solution showed that 15% of the alumina had been removed from the catalyst. The sodium content was reduced in this treatment from 0.09 to 0.04% by weight.

Samples (12 g.) of the treated catalyst and the starting material were evaluated as follows: Each was packed into a tubular glass reactor and maintained at 550° C. in a stream of air for 14 hours. The reactor was then flushed with nitrogen for about 30 minutes before cooling to 450° C.

Orthoxylene (99.5% pure containing 0.2% toluene, 0.1% paraxylene and 0.2% metaxylene) was fed to the reactor as a vapor at a temperature of 450° C. and atmospheric pressure. The flow rate and the amounts of the products in the effluent stream after 6 hours in each case is given in the following table.

| | Untreated catalyst, | Treated catalyst, |
|---|---|---|
| Flow rate (ml. of liquid hr. $^{-1}$) | 13.2 | 18.6 |
| Moles percent in effluent of— | | |
| Paraxylene | 7.8 | 10.1 |
| Metaxylene | 32.1 | 36.1 |
| Toluene | 1.9 | 2.4 |
| Paraxylene/toluene | 4.2 | 4.2 |

Trimethyl benzenes are also observed in amounts approximately equal to the amount of toluene in each case. It is clear that the activity of the treated catalyst is much greater than that of the untreated material, while the selectivity is unchanged.

EXAMPLE 2

A sample (300 g.) of a similar bead catalyst to that used in Example 1 but having a surface area of 140 $m.^2 g.^{-1}$ and a pore volumee of 0.55 $cm.^3 g^{-1}$ was treated in a similar manner with 2.25 l. of a 0.75 molar aqueous solution of HCl. During the treatment the catalyst lost 13% of its aluminium content and the sodium content was reduced from 0.09 to 0.05% by weight.

EXAMPLE 3

A sample (30 g.) of an identical catalyst to that described in Example 2 was treated with 225 ml. of a 0.4 molar aqueous solution of HCl at 100° C. under reflux for 6 hours. This treatment removed about 25% by weight of the aluminium content of the catalyst and the sodium content was reduced from 0.09 to 0.03% by weight.

EXAMPLE 4

A sample (30 g.) of the same catalyst as used in Example 3 was treated with 225 ml. of a 0.10 molar aqueous solution of HF for 24 hours at room temperature. This treatment removed 8% of the aluminum present and the sodium content was reduced from 0.09 to 0.085% by weight.

EXAMPLE 5

A sample (30 g.) of the same catalyst as used in Example 3 was treated with 225 ml. of a 0.73 molar aqueous solution of HBr for 24 hours at room temperature. This treatment removed 13% of the aluminum present and the sodium content was reduced from 0.09 to 0.04% by weight.

EXAMPLE 6

Each of the catalyst (12 g.) described in Examples 2 to 5 and the starting material were tested for performance in orthoxylene isomerization as described in Example 1. The following table gives the feed rate and the effluent composition after 6 hours on-line.

| | Catalyst | | | | |
|---|---|---|---|---|---|
| | Untreated, | Ex. 2, | Ex. 3, | Ex. 4, | Ex. 5, |
| Flow rate (g. of liquid hr.$^{-1}$) | 10.4 | 17.7 | 16.0 | 25.2 | 17.2 |
| Moles percent in effluent of— | | | | | |
| Paraxylene | 8.6 | 9.8 | 11.2 | 10.9 | 9.0 |
| Metaxylene | 36.1 | 37.8 | 40.7 | 40.7 | 37.0 |
| Toluene | 2.0(5) | 2.1 | 2.6 | 3.2 | 2.0 |
| Paraxylene/toluene | 4.2 | 4.7 | 4.3 | 3.4 | 4.5 |

As before trimethyl benzenes were observed in amounts equal to the amount of toluene in each case. It will be observed that each of the treated catalysts is much more active than the untreated material and apart from Example 4 (the HF treated catalyst) are more selective for isomerization relative to disproportionation.

EXAMPLE 7

A 30 g. sample of a silica/alumina bead catalyst containing 10% alumina and having a surface area of 186 $m.^2g.^{-1}$ and a pore volume of 0.54 $cm.^3g.^{-1}$ was treated with 1.3 l. of a saturated solution of EDTA in water under reflux at 100° C. for 48 hours. The resulting material was filtered, washed and dried in a stream of air at 200° C. This treatment removed about 15% of the aluminum in the catalyst and the sodium content was reduced from 0.09 to 0.05% by weight.

Both the treated catalyst and the starting material were tested for performance in orthoxylene isomerization as described in Example 1. The flow rates and the composition of the effluent after 6 hours on-line are given in the following table.

| | Untreated catalyst, | Treated catalyst, |
|---|---|---|
| Flow rate (ml. of liquid hr. $^{-1}$) | 19.1 | 32.2 |
| Moles percent in effluent of— | | |
| Paraxylene | 10.4 | 9.1 |
| Metaxylene | 37.6 | 34.5 |
| Toluene | 2.4 | 2.2 |
| Paraxylene/toluene | 4.2 | 4.2 |

As before, trimethyl benzenes were formed in amounts equal to the amount of toluene. The results show that the treated catalyst is much more active than untreated catalyst but has the same selectivity.

EXAMPLE 8

A 30 g. sample of a silica/alumina bead catalyst containing 10% alumina and having a surface area of 108 $m.^2g.^{-1}$ and a pore volume of 0.55 $cm.^3g.^{-1}$ was treated at 100° C. for 48 hours with 200 mls. of a saturated solution in water at EDTA. By EDTA is meant ethylene diamine tetra acetic acids. The treated material was then filtered off, washed and dried at 200° C. in a stream of air. This treatment removed 1% of the aluminium in the catalyst and the sodium content was reduced from 0.09 to 0.07% by weight.

Both the treated and untreated catalyst were tested for preformance in orthoxylene isomerization as described in Example 1. The flow rates used and the composition of the effluent after 6 hours on-line are given in the following table.

| Flow rate (ml. of liquid hr. $^{-1}$) | Untreated catalyst, 7.0 | Treated catalyst, 11.4 |
|---|---|---|
| Moles percent in effluent of— | | |
| Paraxylene | 10.1 | 12.2 |
| Metaxylene | 38.2 | 41.1 |
| Toluene | 2.5 | 2.4 |
| Paraxylene/toluene | 4.1 | 5.1 |

EXAMPLE 9

Another 30 g. sample of the same starting material as described in Example 8 was treated with 225 mls. of 0.75 molar solution of HCl saturated with EDTA at room temperature for 24 hours. It was then filtered, washed and dried at 200° C.

The catalyst was then tested for performance in orthoxylene isomerization as in Example 1. The flow rate used and the effluent composition after 6 hours on-line are given in the following table:

| Flow rate (ml. of liquid hr. $^{-1}$) | |
|---|---|
| Moles percent in effluent of— | |
| Paraxylene | 9.0 |
| Metaxylene | 32.5 |
| Toluene | 1.9 |
| Paraxylene/toluene | 4.7 |

This catalyst, prepared by the combined treatment, was much more active than that prepared by simple EDTA treatment described in Example 8.

EXAMPLE 10

A sample (50 g.) of silica/alumina bead catalyst containing 10% alumina and having a surface area of 450 m.$^2$g.$^{-1}$ and a pore volume of 0.52 cm.$^3$g.$^{-1}$ was treated at 204° C. for 4.5 hours in liquid water saturated with EDTA. The resulting material was filtered and dried at 200° C. It had a surface area of 195 m.$^2$g.$^{-1}$ and a pore volume of 0.54 cm.$^3$g.$^{-1}$.

Both the treated and untreated material were tested for performance in othoxylene isomerization as described in Example 1. The feed rate used and the composition of the effluent in each case is given in the following table:

| Flow rate (g. of liquid hr. $^{-1}$) | Untreated catalyst, 26.5 | Treated catalyst, 14.4 |
|---|---|---|
| Moles percent in effluent of— | | |
| Paraxylene | 9.6 | 9.7 |
| Metaxylene | 34.6 | 35.5 |
| Toluene | 4.0 | 2.3 |
| Paraxylene/toluene | 2.3 | 4.2 |

Trimethyl benzenes were formed in amounts equal to the amount of toluene. The table shows that although the treated catalyst is less active than the starting material it is much more selective towards isomerization.

EXAMPLE 11

30 grams of a silica/alumina bead catalyst containing 10% alumina and having a surface area of 135 m.$^2$g.$^{-1}$ and a pore volume of 0.52 cc. g.$^{-1}$ were soaked for 24 hours in 225 mls. of a 0.75 molar nitric acid aqueous solution at ambient temperature. It was then filtered off and dried in an oven at 200° C. for 15 hours. Analysis of the treatment solution showed that 12% of the alumina present in the catalyst was removed by this treatment. The sodium content was reduced from 0.09 to 0.04% by weight.

The resulting catalyst and the starting material were tested for performance in orthoxylene isomerization at 450° C. as in Example 1. The flow rate used and the product compositions are given in the following table:

| Flow rate (ml. of liquid hr. $^{-1}$) | Untreated catalyst, 10.4 | Treated catalyst, 22.1 |
|---|---|---|
| Moles percent in effluent of— | | |
| Paraxylene | 8.6 | 8.7 |
| Metaxylene | 36.1 | 35.9 |
| Toluene | 2.1 | 1.9 |
| Paraxylene/toluene | 4.1 | 4.6 |

Trimethyl benzenes were also observed in amounts approximately equal to the amount of toluene in each case. It is clear that the treated catalyst is much more active and has a higher selectivity towards isomerization.

EXAMPLE 12

300 g. of silica/alumina catalyst having an analysis of 10% alumina and 90% silica, a surface area of 140 m.$^2$/g. and a pore volume of 0.55 cm.$^2$/g. in the form of 4 mm. beads, were added to 2.25 l. of a 0.75 molar solution of HCl. After standing for 24 hours at room temperature, the catalyst was filtered and dried at 200° C., then calcined at 550° C. Analysis of the treating solution showed that 13% of the alumina had been removed from the catalyst. The sodium content was reduced in the treatment from 0.09 to 0.05% by weight.

EXAMPLE 13

330 g. of a similar bead catalyst to that used in Example 12 were treated with 2.2 l. of a saturated solution of EDTA in water (i.e. 0.034 molar) under reflux at 100° C. for 48 hours. The resulting material was filtered, washed and dried at 200° C. then calcined at 550° C. This treatment removed about 10% of the alumina in the catalyst and reduced the sodium content from 0.09 to 0.5% by weight.

Both of the above catalysts, and the common starting material were tested for performance in xylenes isomerization at 450° C. and 1.5 bars pressure absolute. In each case, the same mixed xylenes feedstock was used (composition by weight: toluene 1.04%, ethylbenzene 8.6%, paraxylene 8.5%, metaxylene 55.0%, orthoxylene 25.5%). Weight hourly space velocity (WHSV) was adjusted to give a constant proportion of paraxylene in each reaction product. Water was fed to the reactor at the stated rate. Details of the runs performed are given in the following table.

| | Untreated | Ex. 12 | Ex. 13 |
|---|---|---|---|
| Water (p.p.m. v./v.) added to feed | 700 | 900 | 900 |
| WHSV | 1.56 | 2.58 | 2.41 |
| p-Xylene in product [1] | 17.5 | 17.5 | 17.3 |
| Xylenes converted to other materials [1] | 3.1 | 3.5 | 2.9 |

[1] Average of 4 samples taken after 3, 6, 9 and 12 hours on-line respectively.

It can be seen from these results that the treated catalysts are much more active than the untreated catalyst, but selectivity is the same in each case (within the limits of experimental error).

EXAMPLE 14

A silica/alumina catalyst having an analysis of 10% by weight alumina, a surface area of 130 m.$^2$/g. and a pore volume of 0.55 cm.$^3$/g. in the form of 4 mm. beads, was treated with beads of BSS mesh size 14 to 52 of an ion exchange resin of the sulphonated polystyrene type sold by British Drug Houses Limited under the trade name Amberlite Resin IR 120(H) as follows: 400 g. of the catalyst and 400 g. of the resin were added to 2 liters of distilled water and the mixture was boiled for 7 hours. The resin was then separated from the catalyst by washing on a sieve with distilled water and the catalyst was dried at 200° C. when calcined at 550° C. in a stream of air. Analysis of the resin showed that 6% of the alumina originally present had been removed from the catalyst, i.e. the final alumina content was 9.4% by weight. The sodium content was reduced from 0.09% to 0.02% by weight.

The treated and untreated catalysts were compared for performance in xylenes isomerization at 450° C. and 1.5 bars pressure absolute. In each case the feed had the following composition (percent by weight).

| | |
|---|---:|
| Toluene | 1.04 |
| Ethylbenzene | 8.6 |
| Paraxylene | 8.5 |
| Metaxylene | 55.0 |
| Orthoxylene | 25.5 |

Water was injected at a rate of 1,000 parts per million based on the feed. Weight hourly space velocity (WHSV) was adjusted to give the same paraxylene concentration in each product. Details of the runs are given in the following table:

| | Untreated | Treated |
|---|---:|---:|
| WHSV (hr.$^{-1}$) | 1.06 | 1.73 |
| Paraxylene in product [1] (percent) | 17.8 | 17.8 |
| Increase,[1] Δp (percent) | 9.3 | 9.3 |
| Xylenes converted to other materials,[1] Δx (percent) | 4.1 | 3.8 |

[1] Average for 4 samples taken after 3, 6, 9 and 12 hours on-line.

The above figures show that the treated catalysts was 63% more active than the untreated catalyst.

EXAMPLE 15

30 grams of the same silica/alumina catalyst used in Example 1 were added to 225 mls. of a solution containing 0.57 mole of hydrogen chloride per liter instead of the solution containing 0.84 mole hydrogen chloride per liter. After standing for 24 hours at room temperature the catalyst was filtered and dried in an oven at 200° C. for 15 hours.

Samples (12.0 grams) of the treated and untreated catalyst were tested for performance in orthoxylene isomerization as in Example 1. The feed rates and product compositions obtained after 6 hours on-line are given in the following table:

| | Untreated catalyst | Treated catalyst |
|---|---:|---:|
| Flow rate (g. hr.$^{-1}$) | 13.2 | 18.0 |
| Moles percent in Effluent of— | | |
| Paraxylene | 7.8 | 11.8 |
| Metaxylene | 32.1 | 39.8 |
| Toluene | 1.9 | 2.8 |
| Paraxylene÷toluene by moles | 4.2 | 4.2 |

Trimethyl benzenes were also observed in amounts approximately equal to the amount of toluene in each case. It is clear that the activity of the treated catalyst is much greater than that of the untreated catalyst, while the selectivity is unchanged.

EXAMPLE 16

A catalyst identical to that of Example 1 but which had been exposed to liquid water at 198° C. for 24 hours and having after this treatment a surface area of 133 square meters per gram and a pore volume of 0.54 ml./gram was treated in the same manner with a 1.03 molar solution of hydrochloric acid. 13% of the Al$_2$O$_3$ present and about 50% of sodium were removed.

Both the treated and untreated catalysts (12 grams) were tested for performance in orthoxylene isomerization as in Example 1. The feed rates and product compositions obtained after 6 hours on-line are given in the following table:

| | Untreated catalyst | Treated catalyst |
|---|---:|---:|
| Feed rate (g. hr.$^{-1}$) | 12.2 | 16.3 |
| Moles percent in effluent of— | | |
| Paraxylene | 8.0 | 9.8 |
| Metaxylene | 32.2 | 35.1 |
| Toluene | 1.8 | 2.0 |
| Paraxylene÷toluene by moles | 4.4 | 4.9 |

Trimethyl benzenes were also observed in an amount approximately equal to the amount of toluene. It may be observed that the treated catalyst is much more active and significantly more selective for isomerization than the untreated catalyst.

EXAMPLE 17

30 grams of a silica/alumina bead catalyst containing 10% alumina and 90% silica and having a surface area of 135 m.$^2$g.$^{-1}$ and a pore volume of 0.52 m.$^3$g$^{-1}$ were added to 22.5 mls. of an aqueous solution containing 3.0 moles of nitric acid per liter. After standing for 24 hours at ambient temperature the solution was drained out and the catalyst washed 3 times by soaking in 22 mls. of cold water for 24 hours. Analysis of the acid solution and the washings indicated that 13% of the alumina had been removed from the catalyst. The sodium content was reduced from 0.09 to 0.04% by weight.

Samples (12 g.) of the treated and untreated material were evaluated for performances in orthoxylene isomerization at 450° C. as described in Example 1. The flow rate and the amounts of the products in the effluent in each case is given in the following table.

| | Untreated catalyst | Treated catalyst |
|---|---:|---:|
| Flow rate (ml. of liquid hr.$^{-1}$) | 10.4 | 23.2 |
| Moles percent in effluent of— | | |
| Paraxylene | 8.6 | 9.17 |
| Metaxylene | 36.1 | 36.57 |
| Toluene | 2.1 | 1.83 |
| Paraxylene/toluene | 4.1 | 5.0 |

Trimethyl benzenes were also observed in amounts approximately equal to the amount of toluene in each case.

The treated catalyst has a greater activity and a higher selectivity towards isomerization.

Spent silica/alumina catalysts containing substantially 7 to 49% by weight of alumina which have previously been used in alkyl aromatic hydrocarbon isomerization processes may sometimes with advantage be treated to remove 1 to 35%, and preferably 7 to 20% of the total alumina present to give a catalyst containing at least 6% and at most 40% of alumina.

What is claimed is:

1. A process which comprises an alkyl aromatic hydrocarbon in the presence of an amorphous silica/alumina catalyst of which the alumina content has been reduced by from 1% to 35% of the total alumina originally present, the catalyst having before treatment a surface area in the range 50 to 700 square meters/gram and a mean pore diameter in the range 10 to 400 A. and comprising before treatment substantially 7 to 40% by weight of alumina and containing after treatment, at least 6% by weight of alumina.

2. A process as claimed in claim 1 in which the alumina content has been reduced by from 7 to 20% of the total alumina originally present.

3. A process as claimed in claim 1 in which the catalyst comprises 7 to 15% by weight of alumina before treatment.

4. A process as claimed in claim 1 in which the alumina content of the catalyst has been reduced by treatment with acids or complexing agents.

5. A process as claimed in claim 4 in which the acid or complexing agent is used as a solution in water or an alcohol having 1 to 5 carbon atoms.

6. A process as claimed in claim 1 in which catalyst has been contacted with liquid water at a temperature above 100° C.

7. A process as claimed in claim 1 in which one or more xylenes containing less than an equilibrium concentration of paraxylene are isomerized to produce a product having a higher concentration of paraxylene.

8. A process as claimed in claim 1 in which one or more xylene containing less than an equilibrium amount of orthoxylene are isomerized to produce a product having a greater concentration of orthoxylene.

9. Amorphous silica/alumina catalysts of which the alumina content has been reduced by from 1% to 35% of the total alumina originally present, the catalyst having before treatment a surface area in the range 50 to 700 square meters/gram and a mean pore diameter in the range 10 to 400 A. and comprising before treatment, substantially 7 to 40% by weight of alumina and containing, after treatment, at least 6% by weight of alumina.

References Cited

UNITED STATES PATENTS

| 3,116,973 | 1/1964 | Haden | 252—450 |
| 3,130,170 | 4/1964 | Stover et al. | 252—450 |
| 3,350,098 | 8/1967 | Haden et al. | 252—450 |
| 3,691,099 | 9/1972 | Young | 252—455 Z |

CURTIS R. DAVIS, Primary Examiner

U.S. Cl. X.R.

260—450

UNITED STATES PATENT OFFICE
CERTIFICATE OF CORRECTION

Patent No. 3,793,384          Dated February 19, 1974

Inventor(s) John G. Chenoweth, Ivan J.S. Lake, Roy J. Sampson, Paul Osmond, and Douglas Shooter It is certified that error appears in the above-identified patent and that said Letters Patent are hereby corrected as shown below:

In claim 1, line 1 at column 8, line 54 after "comprises" insert --isomerizing--.

Signed and Sealed this

Fifteenth Day of March 1977

[SEAL]

Attest:

RUTH C. MASON
Attesting Officer

C. MARSHALL DANN
Commissioner of Patents and Trademarks